(12) United States Patent
Signoretti et al.

(10) Patent No.: US 7,821,244 B1
(45) Date of Patent: Oct. 26, 2010

(54) APPARATUS AND METHOD FOR CHARGE STORAGE AND RECOVERY FOR VARIABLE OUTPUT VOLTAGE REGULATORS

(75) Inventors: Barry Signoretti, Milpitas, CA (US);
Jianhui Zhang, San Jose, CA (US);
David I. Anderson, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 285 days.

(21) Appl. No.: 12/183,945

(22) Filed: Jul. 31, 2008

(51) Int. Cl.
*G05F 1/40* (2006.01)
*G05F 1/56* (2006.01)
(52) U.S. Cl. ..................... 323/288; 323/271
(58) Field of Classification Search .............. 323/266, 323/268, 271, 282, 288
See application file for complete search history.

(56) References Cited

U.S. PATENT DOCUMENTS

| | | | |
|---|---|---|---|
| 5,940,285 A | 8/1999 | Carrere et al. | |
| 6,288,951 B1 | 9/2001 | Chen et al. | |
| 6,429,730 B2 | 8/2002 | Houghton et al. | |
| 6,459,595 B2* | 10/2002 | Assow | 363/21.14 |
| 6,563,235 B1 | 5/2003 | McIntyre et al. | |
| 6,859,091 B1* | 2/2005 | Nicholson et al. | 327/536 |
| 7,408,328 B2* | 8/2008 | Johnson et al. | 323/222 |
| 7,634,674 B2* | 12/2009 | Chen et al. | 713/300 |

* cited by examiner

*Primary Examiner*—Matthew V Nguyen
(74) *Attorney, Agent, or Firm*—Frommer Lawrence & Haug LLP; Matthew M. Gaffney (57) ABSTRACT

A circuit for voltage regulation is provided. The circuit includes a variable output voltage regulator and an output capacitor circuit. The output capacitor circuit includes at least two output capacitors and at least one switch. The variable output voltage regulator is capable of providing a regulated DC output voltage at two or more different voltage levels. When the output voltage is changed to a lower output voltage level, one of the output capacitors in the output capacitor circuit is switched out of the circuit to conserve the charge stored on it. When the output voltage returns to the higher output voltage level, the output capacitor that was switched out is switched back in.

20 Claims, 5 Drawing Sheets

APPARATUS AND METHOD FOR CHARGE STORAGE AND RECOVERY FOR VARIABLE OUTPUT VOLTAGE REGULATORS

FIELD OF THE INVENTION

The invention is related to voltage regulators, and in particular but not exclusively, to an apparatus and method for increasing recovery time for a change in the output voltage level of a variable output voltage regulator.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

Many other types of voltage regulator topologies exist, including DC-DC converters and AC-DC converters with regulated DC voltage outputs.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for voltage regulation. The circuit includes a variable output voltage regulator and an output capacitor circuit. The output capacitor circuit includes at least two output capacitors and at least one switch. The variable output voltage regulator is capable of providing a regulated DC output voltage at two or more different voltage levels. When the output voltage is changed to a lower output voltage level, one of the output capacitors in the output capacitor circuit is switched out of the circuit to conserve the charge stored on it. When the output voltage returns to the higher output voltage level, the output capacitor that was switched out is switched back in to restore the stored charge.

Figure 1:
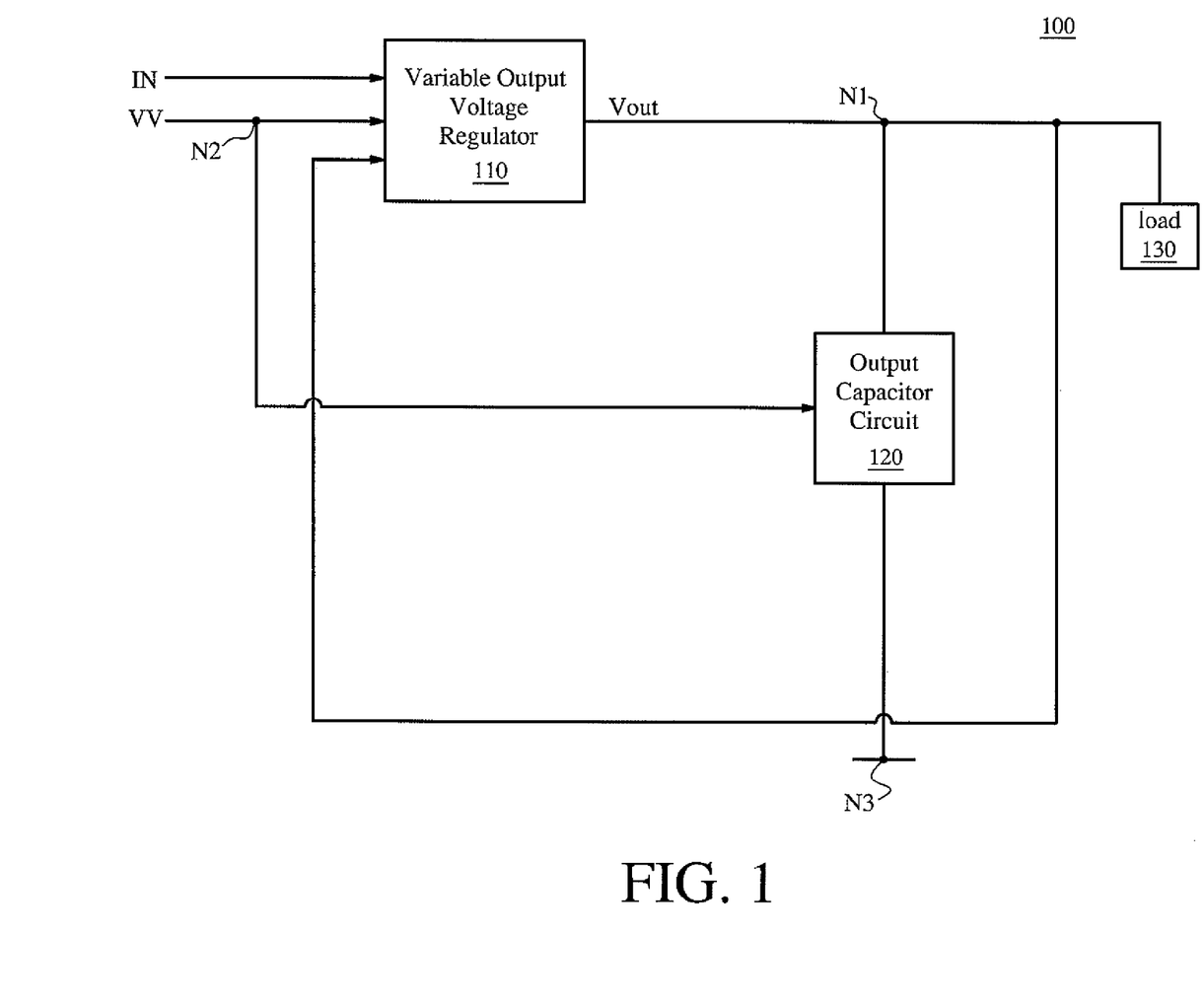
FIG. 1 shows a block diagram of an embodiment of a circuit.

FIG. 1 shows a block diagram of an embodiment of circuit 100. Circuit 100 includes variable output voltage regulator 110, output capacitor circuit 120, and load 130.

Variable output voltage regulator 110 is arranged to convert input signal IN into output voltage Vout such that output voltage Vout is a regulated DC output voltage. Variable output voltage regulator 110 may be virtually any DC-DC converter or AC-DC converter that provides a regulated DC output voltage at its output. In one embodiment, variable output voltage regulator 110 is a buck switching regulator, but the invention is not so limited.

In one embodiment, variable output voltage regulator 110 is arranged to receive voltage value signal VV at node N2, and further arranged to adjust the value to which Vout is regulated based on voltage value VV, such that variable output voltage regulator 110 is capable of regulating output voltage Vout to at least two distinct voltage levels. In some embodiments, output capacitor circuit 120 also receives voltage value signal VV. Although not shown in FIG. 1, further logic may be performed on signal VV before it is provided to output capacitor circuit 120. Load 130 is driven by output voltage Vout.

The capability of providing voltage Vout at two or more different voltage levels may be accomplished in different ways in different embodiments. In one embodiment (not shown in FIG. 1), the output voltage is provided at two different voltage levels by comparing the difference between a feedback signal and a reference voltage, a resistor is switched in parallel with the bottom resistor of the voltage divider that provides the feedback voltage at the higher output voltage, and the resistor is switched out at the lower output voltage. In other embodiments (not shown), the different voltage levels for the output may be provided by adjusting the reference voltage to which the feedback voltage is compared. These embodiments and others are within the scope and spirit of the invention.

Additionally, output capacitor circuit 120 is coupled between output node N1 and node N3, where node N3 may be ground, VSS, or the like. In some embodiments, such as an inverting or flyback configuration, node N3 may be a common node or the like.

At steady state, output capacitor circuit 120 functions in the manner in which a typical output capacitor functions in a voltage regulator. Output capacitor circuit 120 includes at least two capacitors and at least one switch (not shown in FIG. 1). At steady state, at least one of the capacitors is coupled to output node N1. At the greatest voltage level that is provided at voltage Vout, there is at least one output capacitor coupled to output node N1; in some embodiments, two or more output capacitors are coupled in series with each other with the series combination coupled to node N1 in some embodiments. Each capacitor that is coupled to output node N1 (in this state) stores at least a portion of the regulated DC voltage. When output voltage Vout is regulated to a lower voltage level than the greatest voltage level, at least one of the capacitors is switched out. If exactly one capacitor was coupled to the output node N1 at the greatest voltage level, that capacitor is switched out while output voltage Vout is regulated at a lower voltage level. If two or more capacitors were coupled in series, with the series combination coupled to output node N1, then at least one of the capacitors that were coupled in series is switched out while the output voltage is regulated to the lower voltage level.

While the output voltage is regulated at the lower output voltage level, then, either a different capacitor or capacitors is switched in to be coupled to output node N1, or, in embodiments in which a series combination of capacitors was coupled to node N1 while the output voltage was regulated to a higher voltage level, then at least one of the capacitors that was part of the series combination may be coupled to output node N1 while the output voltage is regulated to the lower voltage level, and at least part of the series combination of capacitors is switched out while the output voltage is regulated to the lower voltage level. This way, when the output voltage level returns to the greater voltage level, the capacitor switched out may be switched back in. Switching back in the capacitor with the charge stored allows the output voltage to return to the higher voltage level more quickly without waiting for the control loop (and its inherent latency) of variable output voltage regulator 110 to adjust to the higher level via the feedback loop.

There are many different applications for which multiple different output voltages may be used which could benefit from the circuit of FIG. 1. One application it may be used for is Voltage Throttling. Many conventional systems use a technique, sometimes referred to as Voltage Throttling, to dynamically change a power supply voltage to save power. Most microprocessors, ASICs, DSPs, FPGAs, and other complex digital integrated circuits can operate at lower supply voltages when system demands are reduced. Further, Voltage Throttling may be used an analog circuit, such as a Global System for Mobile communications (GSM) base station. Changing the supply voltage to a lower value can maintain the IC's reduced performance while reducing the amount of power consumed. Many systems can enter a Sleep or Suspend mode for long periods of reduced performance. However, significant energy can be conserved if the supply voltage can be reduced frequently for short durations.

Output capacitors are conventionally used in power supplies and converters to reduce voltage ripple and react to load transients by storing charge. In conventional circuits, when the power supply voltage is reduced for power saving operation, the charge stored on the output capacitor is allowed to discharge into the load. The discharge can be done either passively by letting the load ramp down the voltage or actively by activating an additional discharge path. When the power supply output voltage is returned to the normal operational level, the charge on the output capacitor must be restored. So, in conventional circuits, in order to conserve power by changing output voltage, a certain amount of energy must be lost. As the frequency of the Voltage Throttling increases, the energy loss can become significant. In addition to the energy loss, the transition time between the voltage levels is determined by the value of the output capacitor which is often too large to be rapidly charged and discharged.

For example, in a GSM base station, individual transmitters are assigned to a time slot. A frame consists of 8 time slots. So, during approximately 7 of the 8 time slots a transmitter may not be transmitting at any given time. Reducing the power consumption during the idle time slots can result in a significant power savings, particularly when alternating voltage each time slot. In many base stations, the supply voltage to the transmitter power amplifiers is reduced for 7 of the 8 time slots in order to save energy. However, by employing an embodiment of circuit 100 of FIG. 1, additional power saving can be gained during Voltage Throttling by conserving the energy stored on the power supplies output capacitor. The GSM base station has another constraint in that a modulation in the power amplifier power supply can cause adjacent channel interference. To avoid this problem, the Voltage Throttling must occur during the time period that separates the transmission time slot.

When a voltage is applied to a capacitor, an electric charge is stored according to the relationship $Q=CV$. When the output voltage of a DC-DC converter is reduced via the control loop, the charge on the capacitor must also be reduced. This is accomplished by reducing the current sourced by the converter and allowing the capacitor charge to supplement the demands of the load. Once the desired voltage is reached, the converter returns to normal steady state operation. Increasing the output voltage to the original level is the reverse procedure. The converter sources additional current to replace the charge on the output capacitor.

However, by using circuit 100, the charge storage provided by output capacitor circuit 120 may significantly reduce the power loss resulting from transition from one regulated output voltage level to another during heavy load current, and the slew rate when transitioning occurs relatively quickly.

Although Voltage Throttling is one application for which circuit 100 may be applied, the invention is not so limited. Virtually any application for which the regulated DC output voltage may change between two or more different values may be employed for circuit 100.

Figure 2:
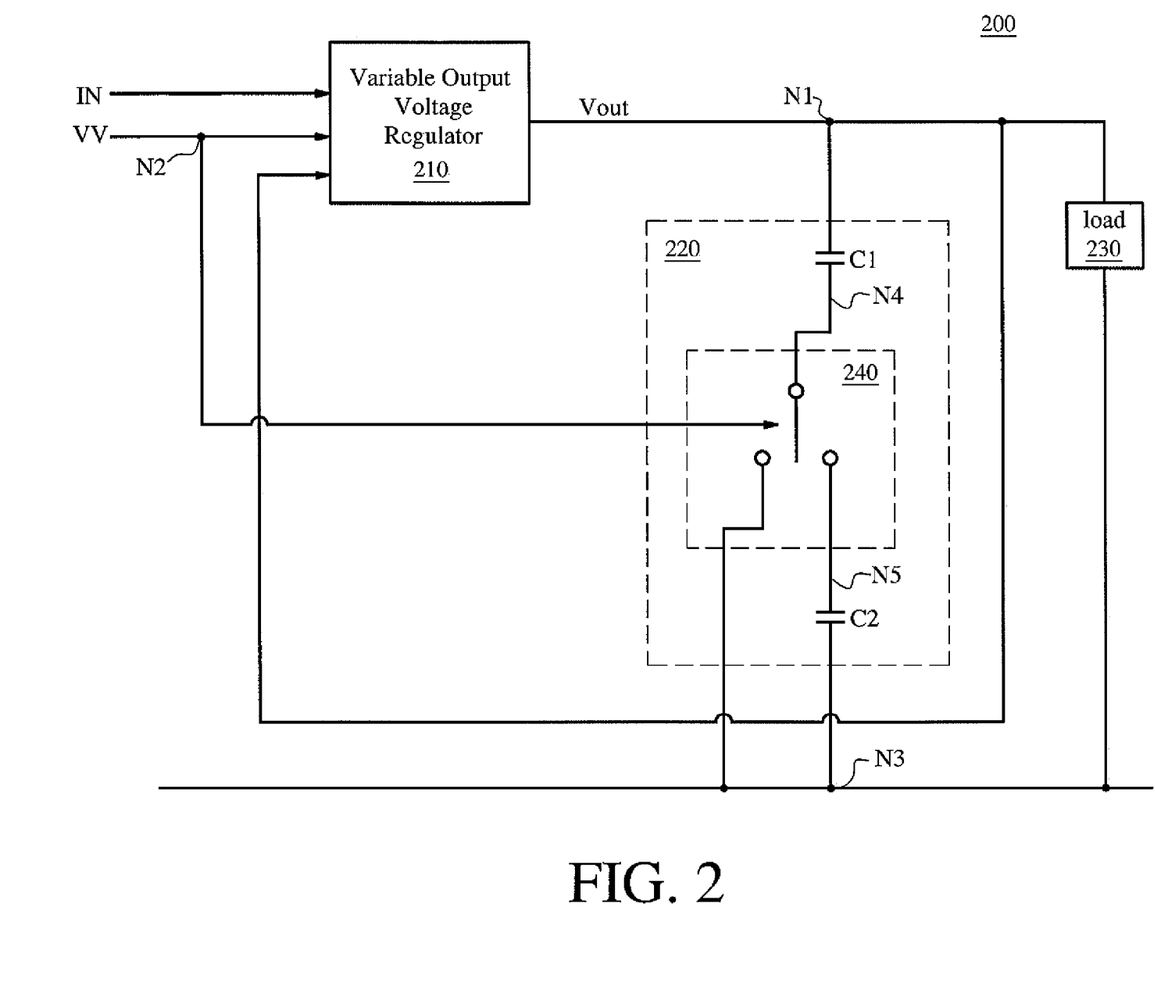
FIG. 2 illustrates a block diagram of an embodiment of the circuit of FIG. 1.

FIG. 2 illustrates a block diagram of an embodiment of circuit 200, which may be employed as an embodiment of circuit 100 of FIG. 1. Output capacitor 220 includes capacitor C1, capacitor C2, and switch circuit 240. In one embodiment, node N3 is ground. However, the invention is not so limited, and in other embodiments, node N3 may be VSS, VDD, or the like.

In operation, voltage value signal VV is provided at two or more different levels. If voltage value signal VV is provided at a first level, then variable output voltage regulator 210 regulates output voltage Vout at a first value. If voltage value signal VV is provided at a second level, then variable output voltage regulator 210 regulates output voltage Vout at a second value that is less than the first value.

In one embodiment, output circuit 220 is arranged as follows. Capacitor C1 is coupled between node N1 and node N4, and capacitor C2 is coupled between node N5 and node N3. Switch circuit 210 is arranged to couple node N4 to node N5 (such that capacitor C1 and C2 are coupled in series with each other) if voltage value signal VV is provided at the first level. Switch circuit 210 is arranged to couple node N4 to node N3 if voltage value signal VV is provided at the second level (such that the top of capacitor C2 is left floating).

Although not shown in FIG. 2, further logic may be performed on signal VV before it is provided to output capacitor circuit 220. In this embodiment, switch 210 does not change at the exact time that signal VV changes levels, but may be shifted in time relative to the time that signal VV changes levels. For example, there may be a slight delay between the time that signal VV changes levels and switch 210 changes states.

One embodiment of circuit 200 operates as follows. In this embodiment, variable output voltage regulator 210 regulates output voltage Vout to two different voltage values depending on voltage value signal VV. If voltage value signal VV indicates that output voltage Vout is to be regulated to the greater of the two values, then switch circuit 240 couples node N4 to node N5, so that capacitor C1 and capacitor C2 are coupled in series with each other, and output voltage Vout is across the series combination of capacitor C1 and capacitor C2. If voltage value signal VV indicates that output voltage Vout is to be regulated to the lesser of the two values, then switch circuit 240 couples node N4 to node N3, so that output voltage Vout is across capacitor C1 only, and the difference between the two different regulated output voltages is stored on capacitor C2. When voltage value signal VV indicates that output voltage Vout is to be returned to the higher voltage value, capacitor C2 is coupled in series with capacitor C1 once more, so that the output voltage V1 returns to the higher voltage value relatively quickly.

When voltage value signal VV is provided at the first level, the series combination of capacitor C1 and capacitor C2 is coupled between node N1 and N3, so that the total equivalent capacitance of output capacitor circuit 210 is given by (C1*C2)/(C1+C2). When voltage value signal VV is provided at the second level, the total equivalent capacitor of output capacitor circuit 210 is given by C1.

If two capacitors are connected in series and a voltage is applied, the charge Q that is stored across both capacitors will be the same charge possessed by each capacitor. If Q=Ctotal*Vtotal then Q=C1*V1=C2*V2, giving C1/C2=V2/V1. Based upon this relationship, the ratio of the capacitors is inversely proportional to the voltages. Using this relationship, each capacitor can be sized according to the above equation based upon the two voltages that the regulator output switches between. For example, if the output voltage of a regulator changes from 15 VDC down to 5 VDC then capacitor C2 would store 10V and capacitor C1 5V. In this example, capacitor C1 (storing 5V) would be twice the value of capacitor C2 (storing 10V) in order to maintain equal charge.

In this example, the capacitor that stores the 10V (capacitor C2), is referenced to ground (for an embodiment in which node N3 is ground). At 15V operation, capacitors C1 and C2 are connected in series with switch circuit 240. As the output voltage begins to transition from 15V to 5V, switch circuit 240 forms a connection between capacitor C1 and node N3. The 10V charge that is stored on capacitor C2 will remain due to a lack of a discharge path. The charge on capacitor C1 is 5V and will facilitate the transition to 5V. The reverse occurs during the transition back to 15V and the charge that was stored on capacitor C2 is returned to the system.

Charge storage occurs by switching between a series combination of the capacitors and isolation of the capacitor C2 during the changing of output voltage Vout. Changing of output voltage Vout can occur either during a heavy load current, in which case the charge storage reduces power loss, or under light load conditions, in which case the slew rate of the output voltage transition can be accelerated.

Although not shown in FIG. 2, circuit 200 may further includes additional circuitry for reducing overshoot and/or undershoot. For example, in one embodiment, non-linear switching for switch circuit 220 is used, as shown below in circuit 400 of FIG. 4 in one embodiment. In one embodiment, circuit 200 may use circuitry for reducing overshoot and/or undershoot other than non-linear switching. For example, in one embodiment (not shown in FIG. 2), switch circuit 220 includes two field effect transistors (FETs), and circuit 200 may further include an RC network connected to the gates of the FETs in switch circuit 220 to control the FET switching speed.

Further, although embodiments with two capacitors coupled in series and in which only two output voltage levels are used were discussed herein, the invention is not so limited. In other embodiments, three or more regulated output voltage levels may be employed, and in some of these embodiments, three or more capacitors are coupled in series for the greatest voltage level. These embodiments and others are within the scope and spirit of the invention.

Figure 3:
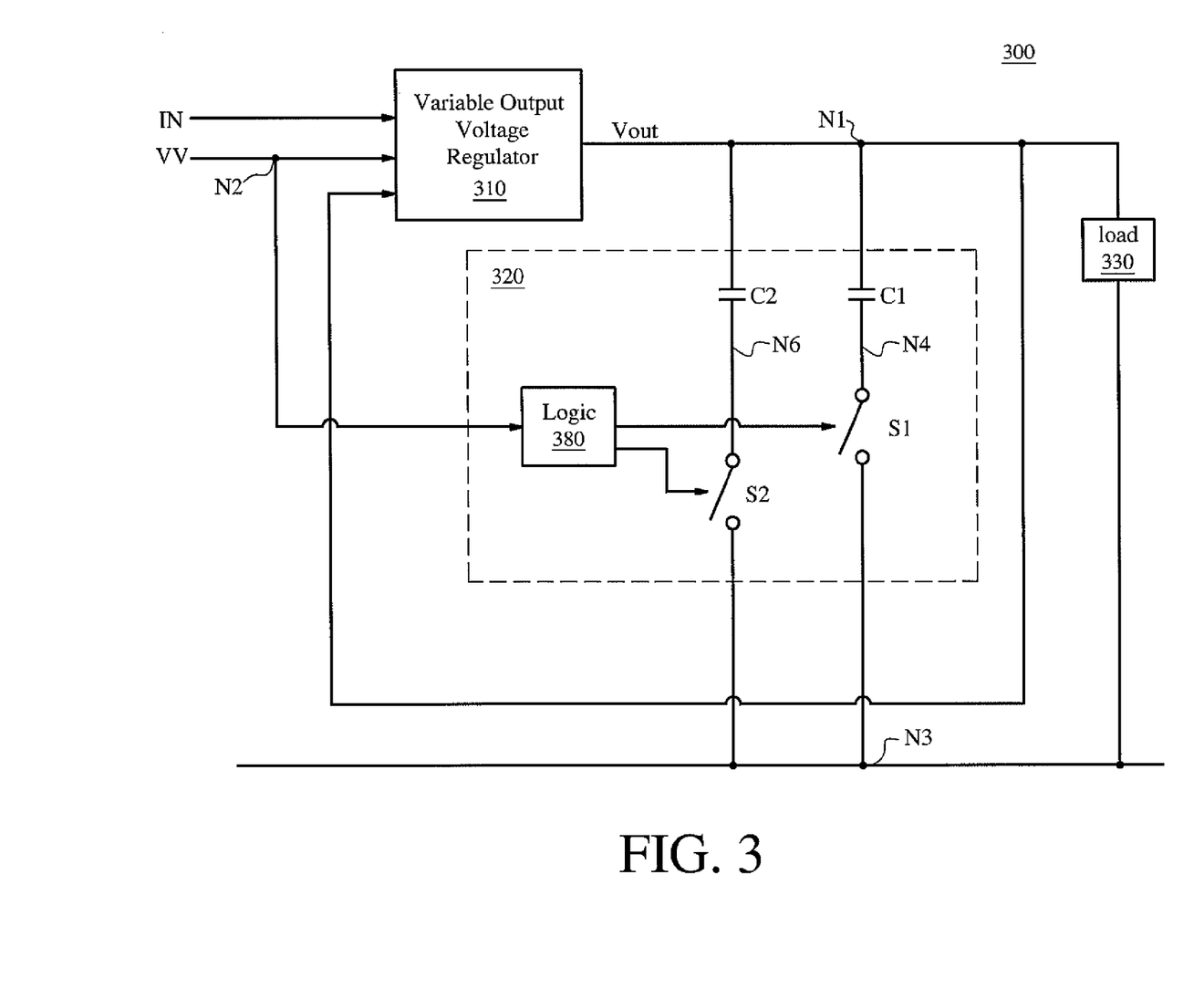
FIG. 3 shows a block diagram of another embodiment of the circuit of FIG. 1.

FIG. 3 shows a block diagram of circuit 300, which may be employed as an embodiment of circuit 100 of FIG. 1. Output capacitor circuit 320 includes capacitor C1 capacitor C2, switch S1, switch S2, and logic circuit 380.

Switch S1 is arranged to close when voltage value signal VV corresponds to the first level, and to open when voltage value signal VV corresponds to the second level. Conversely, switch S2 is arranged to open when voltage value signal VV corresponds to the first level, and to close when voltage value signal VV corresponds to the second level. In one embodiment, when signal VV changes levels, logic circuit 380 controls switches S1 and S2 such that there is a brief period of time in which both switch S1 and S2 are open while output voltage Vout transition to the new value.

One embodiment of circuit 300 operates as follows. In this embodiment, variable output voltage regulator 310 regulates output voltage Vout to two different voltage values depending on voltage value signal VV. If voltage value signal VV indicates that output voltage Vout is to be regulated to the greater of the two values, then switch S2 closes and switch S1 opens, so that capacitor C2 is coupled to output voltage node N1 and capacitor C1 is de-coupled from output voltage node N1 (note that, in the embodiment shown, the top of capacitor C1 is technically connected to node N1; however, with switch S1 open, capacitor C1 is effectively de-coupled from output node N1). If voltage value signal VV indicates that output voltage Vout is to be regulated to the lower of the two values, then switch S2 open and switch S1 closes, so that capacitor C1 is coupled to output voltage node N1 and capacitor C2 is de-coupled from output voltage node N1, and the greater voltage value is stored on capacitor C2.

In the embodiment illustrated in FIG. 3, switches S1 and switch S2 are low-side switches. That is, switch S1 is coupled between the bottom of capacitor C1 and node N3, and switch S2 is coupled between the bottom of capacitor C2 and node N3. However, in other embodiments, one or both of switches S1 and S2 may be high-side switches. For example, switch S1 may instead be coupled between node N1 and the top of capacitor C1, and switch S2 may instead be coupled between node N2 and the top of capacitor C2. These embodiments and others are within the scope and spirit of the invention.

Figure 4:
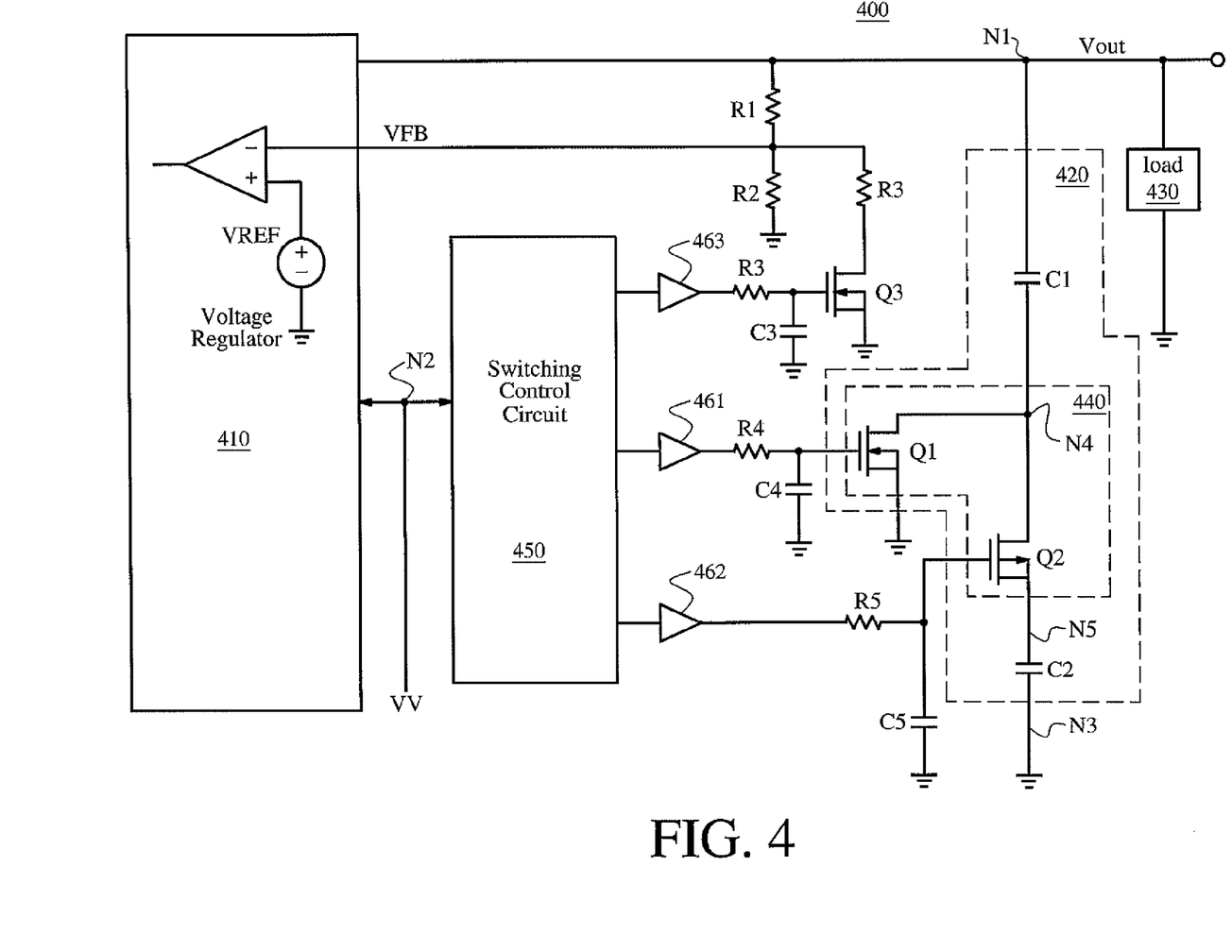
FIG. 4 illustrates a block diagram of an embodiment of the circuit of FIG. 2.

FIG. 4 illustrates a block diagram of an embodiment of circuit 400, which may be employed as an embodiment of circuit 200 of FIG. 2. Switch circuit 440 includes transistor Q1 and transistor Q2. Circuit 400 further includes switching control circuit 450, drivers 461-463, transistor Q3, resistors R1-R5, and capacitors C3-C5.

Transistors Q1-Q3 are arranged to operate as switches. Drivers 461-463 are arranged to drive transistors Q1-Q3, respectively. Switching control circuit 450 is arranged to control the opening and closing of transistor switches Q1-Q3 based on voltage value signal VV, and further based on timing considerations described below.

Resistors R1 and R2 are arranged as a voltage divider to provide feedback voltage FVB to regulator 410 from output voltage Vout. Transistor Q3 is arranged to adjust feedback voltage VFB. When resistor R6 is switched to ground, output voltage Vout is regulated to the higher output voltage and when it is switched out, output voltage Vout is regulated to the lower output voltage.

In one embodiment, the start-up configuration is with Q3 on, Q1 off and Q2 on. This sets output voltage Vout to its high level and C1 and C2 are fully charged to values that are proportional to the capacitance values. If each FET is switched in perfect synchrony, C1 pulls Vout low, C2 maintains all its charge and the regulator is stable at the new output voltage. However, the ideal situation is affected by the regulator control loop response latency, the switching threshold of the FETs (Vt), and the delay and rise and fall times of the FET switching characteristics.

The timing of each FET switching has different effects on the output. Starting with Q3, if it is turned off before C2 is disconnected, after its latency period, regulator 410 tries to regulate to the lower voltage by allowing the load to discharge the C1-C2 combination. Charge is bled off of the capacitors that is restored during the next output voltage switching cycle and the voltage across C2 is below the target voltage. When C2 is switched back in, output voltage Vout is slewed to a voltage lower than the target voltage. If Q3 is turned off after C2 is disconnected but before C1 is connected to ground, output voltage Vout starts to fall and when C2 is switched to ground, output voltage Vout undershoots until the regulator's control loop stabilizes.

If Q3 opens before Q2 opens, output voltage Vout starts to drop towards the new voltage level after the loop latency period and starts to reduce the charge on C1 and C2. If Q3 opens after Q1 closes, charge is added to C1 which is dissipated by the load current as the loop stabilizes.

With these tradeoffs in mind, compromises can be made that will realize acceptable performance levels. Of the problems due to excessive slew rate, overshoot poses the highest risk of circuit damage. This is the case where Q1 opens, Q2 closes and Q3 closes. In this case, Vout overshoots the target voltage primarily due to the latency in the control loop response. This is because regulator 410 supplies current until the target voltage is reached but the switching of the capacitors adds the required voltage instantly. Any charge supplied by regulator 410 then results in overshoot for the control loop to correct. One way to control the overshoot is to slow down the rate at which Q2 is turned on. This can be accomplished in several ways in different embodiments. Using R5 and C5 either collectively or separately, the RC time constant slows the rise and fall times of Q2. Alternately, in other embodiments, pulsing the gate of Q2 in a PWM DAC fashion also has the same effect and can be more easily optimized. The same techniques can also be used on Q1 in order to optimize the switch timing relationship.

In another embodiment, the reference in voltage regulator 410 is modified in order to change the regulated output voltage level, rather than using Q3 to switch a resistor in and out. In one embodiment, the target voltage is set slightly below the final value. As soon as the voltage is exceeded during the switched capacitor transition, the control loop begins to regulate to the lower voltage and limit the overshoot. After the initial transition, the reference voltage is set to the final value.

The overshoot and/or undershoot may also be decreased by decreasing the transition time between the changing of the voltage divider or the reference voltage, and the time that output voltage Vout reaches the new stead-state output voltage. The transition time $T_{tran}$ depends on how fast the control loop responds to the reference voltage (or voltage divider) change and adjusts the duty cycle command accordingly. If a large step change is applied to the reference voltage, the duty cycle command needs to slew a large range to settle down to the new steady state and the corresponding transition time $T_{tran}$ is relatively large.

In one embodiment, in order to shorten the transition time, instead of letting the control loop slew the duty cycle command to the new steady state, the duty cycle command is set directly to the final steady state value to shorten the output voltage Vout transition response time. In one embodiment, this may be done by setting the integrator value to the final steady state value. The integrator (not shown) referred to is the integrator in the compensation loop for the error amplifier (not shown) within regulator 410 in one embodiment. Since the control loop does not need to slew over a wide range of duty cycles, the output voltage Vout transition response time may be greatly reduced.

Setting the duty cycle command directly to the final value may be done for embodiments in which the control loop for voltage regulator 410 is an analog control loop, as well as embodiments in which the control loop for voltage regulator 410 is a digital control loop. In an analog control loop embodiment, the duty cycle setting may be done through setting the integrator capacitor voltage. In a digital control loop embodiment, the duty cycle setting may be done through writing the digital value into the digital integrator register.

In some embodiments, to further reduce the overshoot or undershoot during the output voltage transition from one level to another, instead of changing the reference voltage directly from one level to another, step changes are applied. Step changes may be employed for changing the reference voltage, or for changing the resistor of the voltage divider to cause step changes in the feedback voltage. Also, in some embodiments, instead of directly setting the duty cycle command to the final value, step changes are applied in changing the duty cycle command value.

In one embodiment, for duty cycle prediction, the expected nominal values of the input and output voltages are used to calculate the new duty-cycle. In one embodiment, these values are stored in registers when the system is initiated.

In one embodiment, for duty cycle prediction, the measured value of the input voltage when the regulator was previously in the targeted state is used to dynamically calculate the predicted duty-cycle.

The output voltage rate of the transition is also affected by the output capacitance at node N1. In one embodiment in which voltage regulator 410 is a switching regulator, when output voltage Vout is to be increased, the predicted duty-cycle sets the high-side switch (not shown) in voltage regulator 410 on for a longer duration. In one embodiment in which voltage regulator 410 is a switching, inductive-based regulator, if the timing of the change in duty-cycle is coincident with the maximum value of the inductor current in voltage regulator 410, the peak inductor current exceeds the steady-state peak value until the new steady state is reached. The higher than normal inductor current charges the output capacitor at a higher rate.

Each capacitor shown, such as C1 and C2, may be a single capacitor, or may be one or more capacitors coupled in series and/or in parallel to provide an equivalent capacitance. For example, in one embodiment, capacitor C1 is two capacitors coupled in parallel for capacitive trimming, and capacitor C2 is two capacitors coupled in parallel for capacitive trimming.

Figure 5:
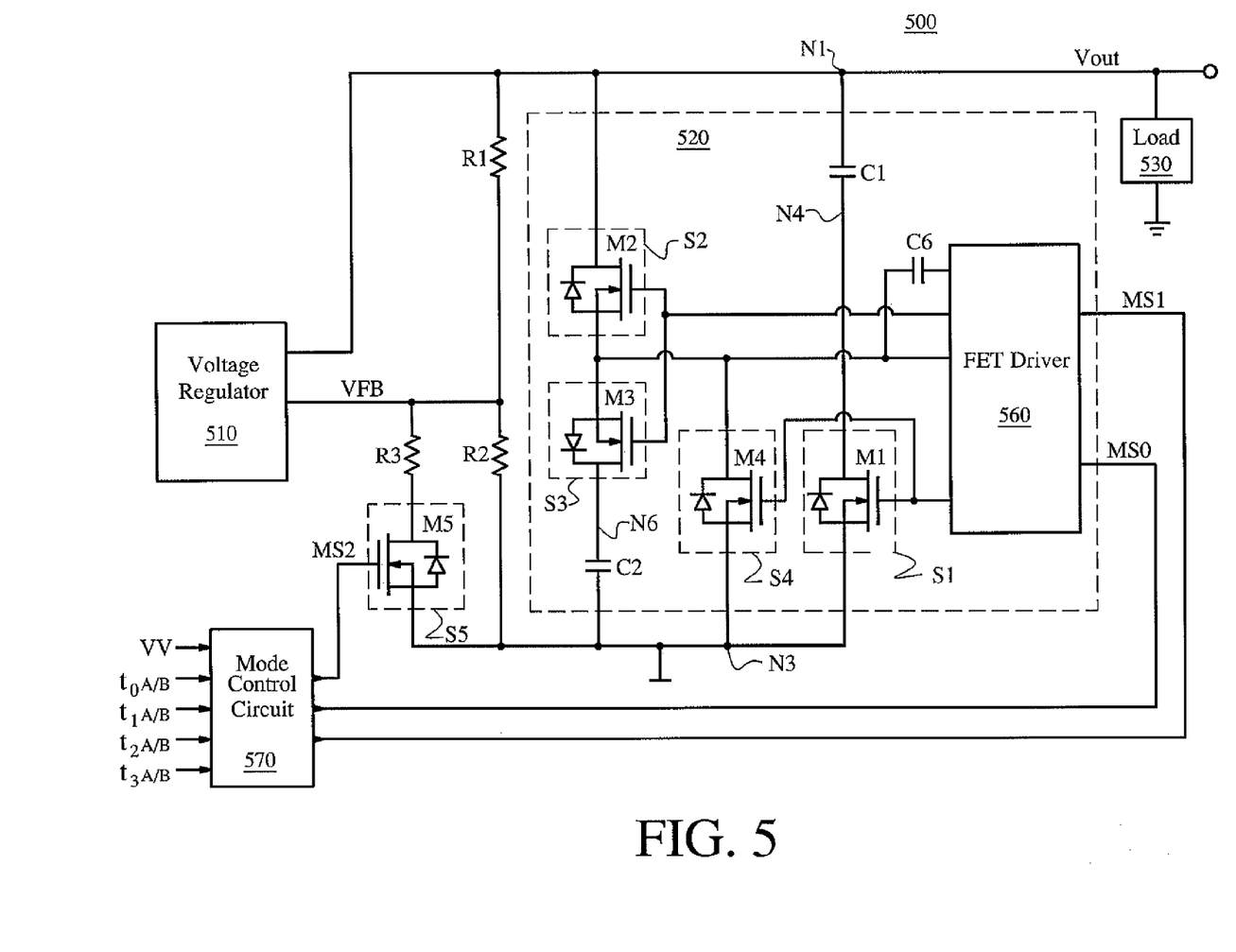
FIG. 5 shows a block diagram of an embodiment of the circuit of FIG. 3, arranged in accordance with aspects of the present invention.

FIG. 5 shows a block diagram of an embodiment of circuit 500, which may be employed as an embodiment of circuit 300 of FIG. 3. Output capacitor circuit 520 further includes switch S3, switch S4, and capacitor C6. Circuit 500 further includes resistors R1-R3, switch S5, and mode control circuit 570. Switches S1-S5 includes transistors Q1-Q5, respectively.

In one embodiment of circuit 500, there are two modes (Mode A and Mode B), where mode B is used for a regulated output voltage that is greater that the regulated output voltage for mode A. In one embodiment, signal MODEB is an embodiment of voltage value signal VV. In this embodiment, when signal MODEB is asserted, it is the first level of voltage value signal VV, and when signal MODEB is not asserted, it is the second level of voltage value signal VV. In another embodiment, a bit MODEB may be set via software, and the voltage of the bit is an embodiment of voltage value signal MODEB. In this embodiment, when the MODEB bit is set, it is the first value of voltage value signal VV, and when the bit is not set, it is the second level of voltage value signal VV (e.g. mode A). In one embodiment, a mode switch can be initiated either by an external signal or by software.

In one embodiment, Mode control circuit 570 is arranged to receive signal MODEB (an embodiment of voltage value signal VV), and to provide signal MS0, MS1, and MS2 to control external circuitry associated to the mode switch. In one embodiment, each signal MS0, MS1, and MS2, has a software configurable polarity and the assertion sequence is controlled by a state-machine in mode control circuit 370. Further, in one embodiment, mode control circuit 570 has software configurable delays $t_{OA/B}$, $t_{1A/B}$, $t_{2A/B}$, and $t_{LA/B}$. In one embodiment, the Mode A/B switch event is synchronized to the internal GSM slot timing. In one embodiment, the synchronization delay can also be configured by software to optimize performance.

The following Mode A/B switch timing parameters can be configured as follows in one embodiment:

Mode Switch Request Synchronization: The Mode A-B switch request is synchronized to the internal clock scheme. The synchronization point can be selected via registers to accommodate for the loop configuration.

$t_{0A/B}$: software configurable delay between the synchronization point and setting control signal MS0 to the specified polarity for Mode A/B.

$t_{1A/B}$: software configurable delay between the synchronization point and setting control signal MS1 to the specified polarity for Mode A/B/

$t_{2A/B}$: software configurable delay between the synchronization point and setting control signal MS2 to the specified polarity for Mode A/B $t_{LA/B}$: software configurable delay between the synchronization point and activating the control loop for Mode A/B.

The signals MS0, MS1, and MS2 can be used to switch in/out output capacitors synchronous to the internal mode switch.

The mode switches are accomplished as follows in one embodiment:

Mode B→A Switching Sequence (e.g., 30V→18V):
1. The sequence is initiated by either the de-assertion of the signal MODEB or by clearing the MODEB-bit via software.
2. The mode switch request is captured and synchronized to a configurable time-slot and clock cycle within the time-slot.
3. After a configurable delay $t_{0A}$ the MS0 output signal is asserted.
4. After a configurable delay time $t_{2A}$ the MS2 output signal is de-asserted. (The resistor R3 is disconnected to form the resistor divider for $V_{OUT}$=18V.)
5. After a configurable delay time $t_{LA}$ the control loop is switched to Mode A. The control loop starts operating in Mode A and generates a regulated output voltage of 18V.
6. After a configurable delay time $t_{1A}$ the MS1 output signal is asserted.

Mode A→B Switching Sequence (e.g., 18V→30V):
1. The sequence is initiated by either the assertion of the MODEB input signal or by setting the MODEB-bit via software.
2. The mode switch request is captured and synchronized to a configurable time-slot and clock cycle within the time-slot.
3. After a configurable delay time $t_{1B}$ the MS1 output signal is de-asserted.
4. After a configurable delay $t_{2B}$ the MS2 output signal is asserted. The register R3 is connected in parallel to R2 to form the resistor divider for $V_{OUT}$=30V.
5. After a configurable delay time $t_{OB}$ the MS0 output signal is de-asserted.
7. After a configurable delay time $t_{LB}$ the control loop is switched to Mode B. The control loop starts operating in Mode B and generates a regulated output voltage of 30V.

In one embodiment, capacitor C6, switch S2, and switch S4 are used for bootstrapping of the voltage at the top of capacitor C2. In other embodiments, no bootstrapping is employed, and capacitor C6, switch S2, and switch S4 are omitted (replacing switch S4 with an open circuit and switch S3 with a closed circuit). As previously discussed, in various embodiments, switch S1 and S2 may each be either high-side switches or low-side switches in various embodiments. FET driver 560 is arranged to drive transistors M1-M4, and to provide bootstrapping in conjunction with capacitor C6 in one embodiment.

The software-configurable delay described with reference to circuit 500 of FIG. 5 may also be used in a series embodiment (e.g. circuit 400 of FIG. 4).

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for voltage regulation, comprising:
a voltage regulator that is arranged to provide a regulated DC voltage at an output node, wherein the voltage regulator is arranged to provide the regulated DC voltage at a first value if voltage value signal corresponds to a first level, and to provide the regulated DC voltage at a second value if the voltage value signal corresponds to a second level, wherein the first value is greater than the second value; and an output capacitor circuit that is coupled to the output node, wherein the output capacitor circuit includes a first capacitor, a second capacitor, and a first switch circuit, and wherein the output capacitor circuit is arranged such that:

if the voltage value signal corresponds to the first level
the second capacitor provides at least a portion of the regulated DC voltage,
else if the voltage value signal corresponds to the second level
the first capacitor is coupled to the output voltage node, and at least one terminal of the second capacitor is left floating.

2. The circuit of claim 1, wherein
the output capacitor circuit is arranged such that:
if the voltage value signal corresponds to the first level
the first capacitor is coupled in series with the second capacitor, and the series combination of the first capacitor and the second capacitor is coupled to the output node such that the regulated output voltage is the sum of a voltage across the first capacitor and the voltage across the second capacitor,
else if the voltage value signal corresponds to the second level
the first capacitor is coupled to the output voltage node, and second capacitor is de-coupled from the first capacitor, such that the regulated output voltage is the voltage across the first capacitor, and such that the voltage across the second capacitor remains substantially unchanged while the voltage value signal corresponds to the first level.

3. The circuit of claim 1, wherein
the output capacitor circuit is arranged such that:
if the voltage value signal corresponds to the second level
the second capacitor is coupled to the output node and the first capacitor is decoupled from the output node such that the regulated output voltage is the voltage across the second capacitor,
else if the voltage value signal corresponds to the first level
the first capacitor is coupled to the output voltage node, and second capacitor is de-coupled from output node, such that the regulated output voltage is a voltage across the first capacitor, and such that the voltage across the second capacitor remains substantially unchanged while the voltage value signal corresponds to the first level.

4. The circuit of claim 1, wherein
the output capacitor circuit is arranged such that the output capacitor circuit has a first total equivalent capacitance if the voltage value signal corresponds to the first level, and such that the output capacitor circuit has a second total equivalent capacitance if the voltage value signal corresponds to the second level; and wherein the first total equivalent capacitance is different from the second total equivalent capacitance.

5. The circuit of claim 1, wherein
the output capacitor circuit further includes a second switch circuit, wherein
the first switch circuit is arranged to couple the first capacitor to the output node if the voltage value signal corresponds to the first level, and to de-couple the first capacitor circuit from the output node if the voltage value signal corresponds to the second level; and
wherein the second switch circuit is arranged to couple the second capacitor to the output node if the voltage value signal corresponds to the second level, and to de-couple the second capacitor circuit from the output node if the voltage value signal corresponds to the first level.

6. The circuit of claim 1, wherein the voltage regulator is arranged such a voltage divider is adjusted based on the voltage value signal.

7. The circuit of claim 1, wherein the voltage regulator is arranged such that a reference voltage is adjusted based on the voltage value signal.

8. The circuit of claim 1, wherein
the output capacitor circuit includes:
a first capacitor that is coupled to the output node;
a second capacitor; and
a first switch circuit that is arranged to couple the second capacitor in series with the first capacitor if the voltage value signal corresponds to the first level, and such that the second capacitor is de-coupled from the first capacitor if the voltage value signal corresponds to the second level.

9. The circuit of claim 8, wherein
the first capacitor is coupled between the output node and a first node;
the first switch circuit includes a first switch and a second switch;
the first switch is coupled between the first node and a second node;
the first switch is arranged to be open if the voltage value signal corresponds to the first level, and to be closed if the voltage value signal corresponds to the second level;
the second switch is coupled between the second node and a third node;
the second switch is arranged to be closed if the voltage value signal corresponds to the first level, and to be open if the voltage value signal corresponds to the second level; and
wherein the second capacitor is coupled between the third node and the second node.

10. The circuit of claim 1, wherein the output capacitor circuit further includes a logic circuit that is arranged to receive the voltage value signal, and to control the first switch, and wherein the logic circuit is arranged to provide a relatively small delay between changes in the voltage value signal and opening and closing of the first switch.

11. The circuit of claim 10, wherein the logic circuit is arranged such that the relatively small delay is software-configurable.

12. A circuit for voltage regulation, comprising:
a voltage regulator that is arranged to provide a regulated DC voltage at an output node, wherein the voltage regulator is arranged to provide the regulated DC voltage at a first value if voltage value signal corresponds to a first level, and to provide the regulated DC voltage at a second value if the voltage value signal corresponds to a second level, wherein the first value is different from the second value; and
an output capacitor circuit that is coupled to the output node, wherein the output capacitor circuit includes at least two capacitors and at least one switch; the output capacitor is arranged such that the output capacitor circuit has a first total equivalent capacitance if the voltage value signal corresponds to the first level, and such that the output capacitor circuit has a second total equivalent capacitance if the voltage value signal corresponds to the second level; and wherein the first total equivalent capacitance is different from the second total equivalent capacitance.

13. The circuit of claim 12, wherein the output capacitor circuit includes:
a first capacitor that is coupled to the output node;
a second capacitor; and
a first switch circuit that is arranged to couple the second capacitor in series with the first capacitor if the voltage value signal corresponds to the first level, and such that the second capacitor is de-coupled from the first capacitor if the voltage value signal corresponds to the second level.

14. The circuit of claim 13, wherein
the first capacitor is coupled between the output node and a first node;
the first switch circuit includes a first switch and a second switch;
the first switch is coupled between the first node and a second node;
the first switch is arranged to be open if the voltage value signal corresponds to the first level, and to be closed if the voltage value signal corresponds to the second level;
the second switch is coupled between the second node and a third node;
the second switch is arranged to be closed if the voltage value signal corresponds to the first level, and to be open if the voltage value signal corresponds to the second level; and
wherein the second capacitor is coupled between the third node and the second node.

15. A circuit for voltage regulation, comprising:
a voltage regulator that is arranged to provide a regulated DC voltage at an output node, wherein the voltage regulator is arranged to provide the regulated DC voltage at a first value if voltage value signal corresponds to a first level, and to provide the regulated DC voltage at a second value if the voltage value signal corresponds to a second level, wherein the first value is greater than the second value;
a first capacitor that is coupled between the output node and a first node;
a first switch that is coupled between the first node and a second node;
a second capacitor that is coupled between the second node and a third node;
a second switch that is coupled between the second node and the third node; and
a switching control circuit that is arranged to receive the voltage value signal, and to control opening and closing of the first and second switches based, at least in part, on the voltage value signal.

16. The circuit of claim 15, wherein the third node is ground or Vss.

17. The circuit of claim 15, wherein the switching control circuit is arranged to control the first switch and the second switch such that:
if the voltage value signal changes from the first level to the second level, then after a first delay from the time that the voltage value signal changes from the first level to the second level, the first switch closes and the second switch opens, and
if the voltage value signal changes from the second level to the first level, then after a second delay from the time that the voltage value signal changes from the second level to the first level, the first switch opens and the second switch closes.

18. The circuit of claim 17, wherein the first delay is software-configurable, and the second delay is software-configurable.

19. The circuit of claim 15, further comprising:
a first resistor and a second resistor, wherein the first switch includes a control input, the second switch includes a control input, the switching control circuit includes a first output and a second output, the first resistor is coupled between the first output of the switching control circuit and the control input of the first switch, and wherein the second resistor is coupled between the second output of the switching control circuit and the control input of the second switch.

20. The circuit of claim 19, further comprising:
a third capacitor that is coupled between the control input of the first switch and the third node; and
a fourth capacitor that is coupled between the control input of the second switch and the third node.

* * * * *

UNITED STATES PATENT AND TRADEMARK OFFICE
CERTIFICATE OF CORRECTION

PATENT NO. : 7,821,244 B1  
APPLICATION NO. : 12/183945  
DATED : October 26, 2010  
INVENTOR(S) : Barry Signoretti et al.

Page 1 of 1

It is certified that error appears in the above-identified patent and that said Letters Patent is hereby corrected as shown below:

In column 7, line 17, delete "FVB" and insert -- VFB --, therefor.

In column 9, line 44, delete "$t_{OA/B}$," and insert -- $t_{0A/B}$, --, therefor.

In column 9, line 61, delete "A/B/" and insert -- A/B. --, therefor.

In column 9, line 64, after "A/B" insert -- . --.

In column 10, line 35, delete "$t_{OB}$" and insert -- $t_{0B}$ --, therefor.

In column 12, line 10, in claim 6, after "such" insert -- that --.

Signed and Sealed this  
Seventeenth Day of May, 2011

David J. Kappos  
*Director of the United States Patent and Trademark Office*